US011007915B2

(12) United States Patent
Francescatto

(10) Patent No.: US 11,007,915 B2
(45) Date of Patent: May 18, 2021

(54) VEHICLE SEAT COVERING

(71) Applicant: MED 1994 S.R.L., Arcugnano (IT)

(72) Inventor: Danilo Francescatto, Arcugnano (IT)

(73) Assignee: MED 1994 S.R.L., Areugnano (IT)

(*) Notice: Subject to any disclaimer, the term of this patent is extended or adjusted under 35 U.S.C. 154(b) by 0 days.

(21) Appl. No.: 16/485,265

(22) PCT Filed: Feb. 13, 2018

(86) PCT No.: PCT/IB2018/050866
§ 371 (c)(1),
(2) Date: Aug. 12, 2019

(87) PCT Pub. No.: WO2018/146653
PCT Pub. Date: Aug. 16, 2018

(65) Prior Publication Data
US 2019/0389347 A1 Dec. 26, 2019

(30) Foreign Application Priority Data

Feb. 13, 2017 (IT) .......................... 102017000015340

(51) Int. Cl.
*B60N 2/60* (2006.01)
*B32B 27/12* (2006.01)

(52) U.S. Cl.
CPC ................ *B60N 2/60* (2013.01); *B32B 27/12* (2013.01)

(58) Field of Classification Search
CPC .................................. B60N 2/60; B32B 27/12
(Continued)

(56) References Cited

U.S. PATENT DOCUMENTS 3,461,026 A * 8/1969 Schick ..................... D04H 1/46
442/339
3,613,671 A * 10/1971 Poor ....................... B60N 2/976
601/149
(Continued)

FOREIGN PATENT DOCUMENTS

FR 2914594 A1 10/2008
FR 2981020 A1 4/2013

OTHER PUBLICATIONS

International Preliminary Report on Patentability, dated May 3, 2018 for PCT Application No. PCT/IB2018/050866, filed Feb. 13, 2018.

*Primary Examiner* — Mark R Wendell
(74) *Attorney, Agent, or Firm* — Abelman, Frayne & Schwab

(57) ABSTRACT

A vehicle seat covering including a laminar shell suitable which is removably attached to a vehicle seat having a horizontally-orientated seat portion and a vertically-orientated backrest. The covering includes a first portion which covers an upper surface of the horizontal seat portion for supporting a passenger's pelvis/buttocks. A second portion covers a forward surface of the backrest to support the back and/or the lumbar area of the passenger. The first and second portions are configured to provide first and second functional housings, respectively. A first padding is inserted into the first functional housing and has a main inner chamber suitable to improve the comfort, thermoregulation, breathability, and hygroscopicity properties of the laminar shell. A second padding is inserted into the second functional housing and has an auxiliary inner chamber suitable to improve the comfort, thermoregulation, breathability, and hygroscopicity properties of the laminar shell.

15 Claims, 5 Drawing Sheets

(58) Field of Classification Search
USPC .......................................................... 297/229
See application file for complete search history.

(56) References Cited

U.S. PATENT DOCUMENTS

| | | | | |
|---|---|---|---|---|
| 4,078,842 | A * | 3/1978 | Zur ........................ | A47C 7/021 |
| | | | | 297/229 |
| 4,619,481 | A * | 10/1986 | Grudzinskas .......... | A47C 7/467 |
| | | | | 297/284.1 |
| 5,168,590 | A * | 12/1992 | O'Sullivan .......... | A47G 9/0253 |
| | | | | 5/421 |
| 5,833,309 | A * | 11/1998 | Schmitz ................... | A47C 7/74 |
| | | | | 297/180.11 |
| 6,058,535 | A * | 5/2000 | Firkins, Jr. ............. | A47C 7/021 |
| | | | | 5/653 |
| 7,065,814 | B2 * | 6/2006 | Rutkowski ............. | A47D 5/006 |
| | | | | 128/876 |
| 8,950,807 | B2 * | 2/2015 | Lerm ................... | A47C 31/006 |
| | | | | 297/219.12 |
| 2004/0189070 | A1 * | 9/2004 | Ladron De Guevara ..................... | |
| | | | | B60N 2/0244 |
| | | | | 297/284.6 |
| 2006/0208547 | A1 * | 9/2006 | Pollack ................ | B60N 2/2863 |
| | | | | 297/256.13 |
| 2008/0179926 | A1 * | 7/2008 | Kushner ................ | A47C 31/11 |
| | | | | 297/220 |
| 2012/0112502 | A1 * | 5/2012 | Cristoforo .............. | A47C 31/11 |
| | | | | 297/188.01 |
| 2017/0326007 | A1 * | 11/2017 | Hiemenz ................. | B60N 2/60 |
| 2018/0035185 | A1 * | 2/2018 | Fujita ....................... | A47C 7/72 |

* cited by examiner

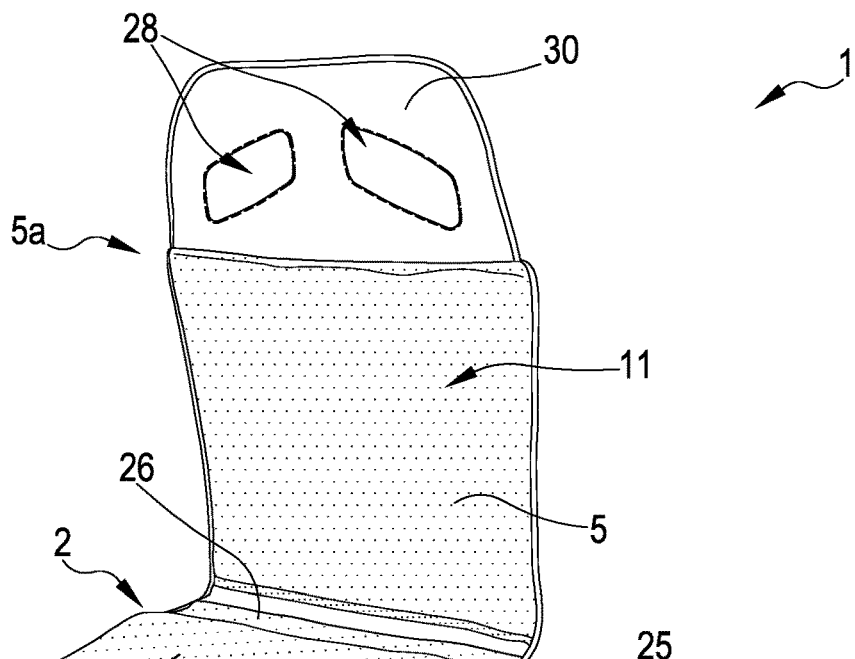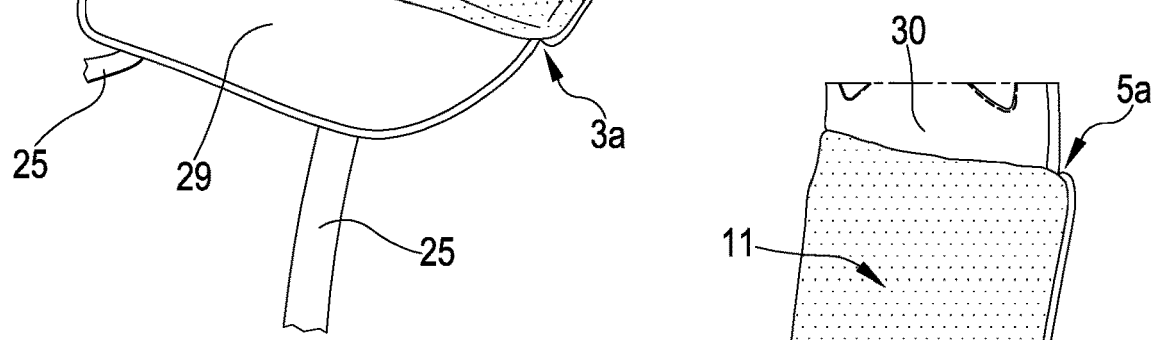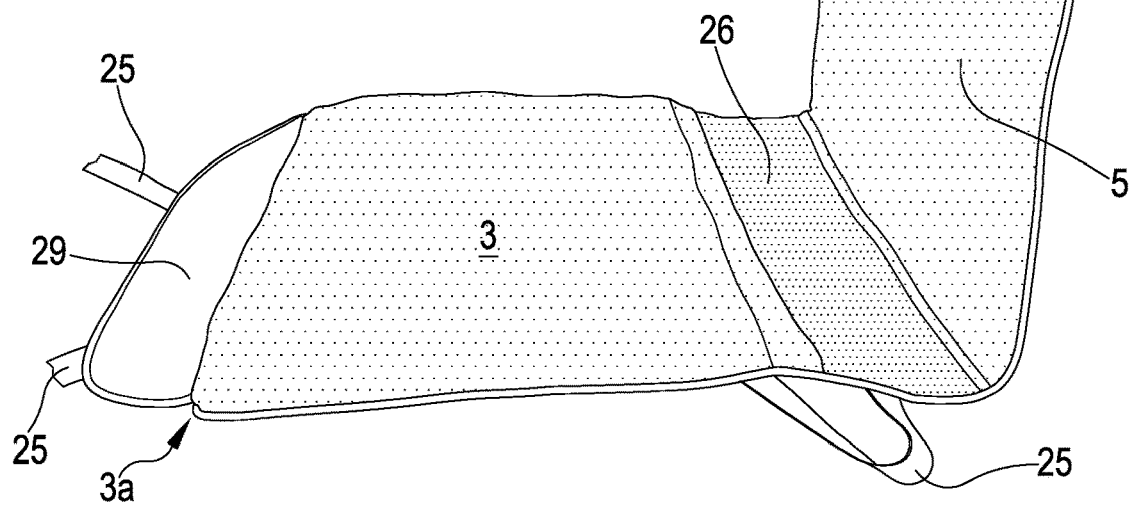

FIG.4
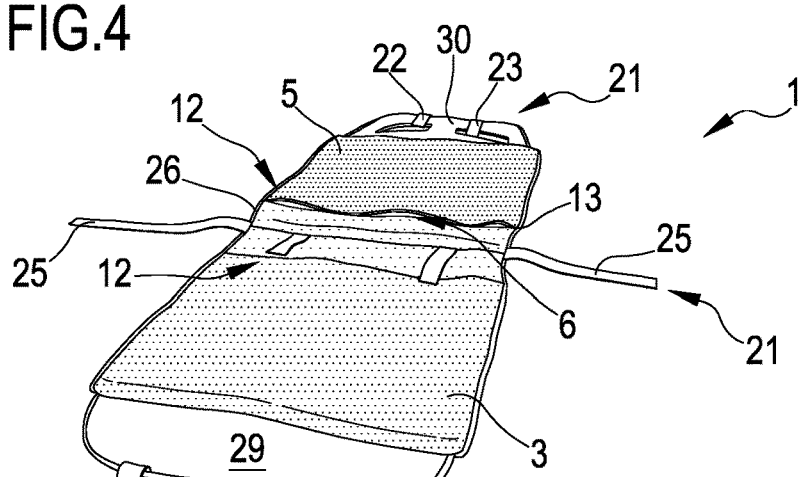
FIG.5
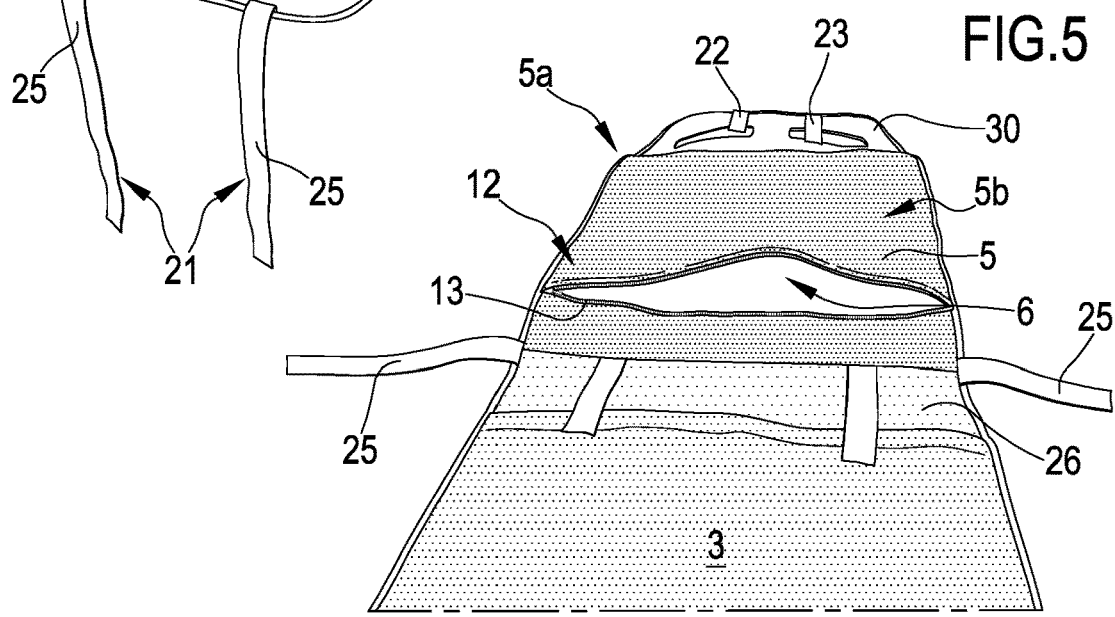
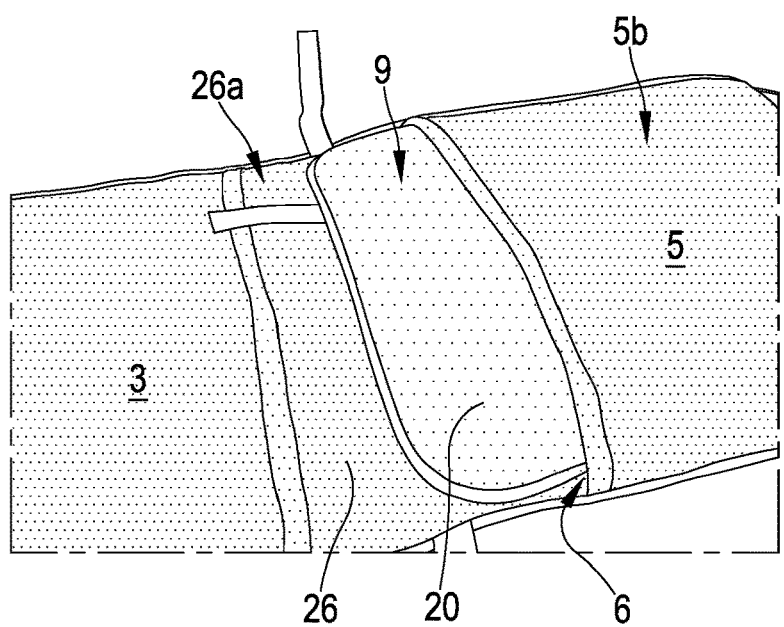
FIG.6

VEHICLE SEAT COVERING

CROSS-REFERENCE TO RELATED APPLICATION

This application claims priority to PCT application no. PCT/IB2018/050866, filed Feb. 13, 2018, which claims priority to Italian application no. 102017000015340, filed Feb. 13, 2017, the contents of which are incorporated by reference in their entireties.

The present invention relates to a vehicles seats covering which it is adapted to be applied to, preferably in a removable manner, with simple and rapid manoeuvres by the user, generally the driver himself.

As it is well known, the evolution of the human species has had the result not only of connoting the person's body upright but also of conforming the vertebral column according to a sinusoidal arrangement or to an S.

The S-shape, on one hand, is optimal for the functionality of the movements and distribution of loads that the backbone must support, on the other hand, however, makes the column very vulnerable and subject to diseases such as typically lumbar arthrosis (or lumbosacral-arthrosis) and cervical arthrosis (or cervical-arthrosis), back pain, low back pain, back-related pathologies (commonly called sciatica), discopathy (generally in the case of herniated disc), kyphosis, scoliosis and so on.

In order to go with or better to prevent these pathologies, it seems increasingly crucial that, during sleep, rest, sitting or other conditions in which a person's body is supported to some extent by a support structure, the anatomical part of the human body in support cooperates by contact with comfort elements such as mattresses, pillows, mattress covers and even more through which the backbone succeeds in maintaining a posture almost equivalent to that one taken by the person when rests in upright position.

Otherwise, indeed, the backbone is forced to place itself in incorrect positions which cause the increase of the aforesaid painful pathologies (which can sometimes become chronic) and the automatic stiffening of the muscles of the body.

Another factor to be evaluated with extreme care when considering the conditions in which a person sleeps, rests or remains seated in this last case on a chair, a sofa or a seat of any vehicle, for example regards the recirculation of air associated with the garments which the support structure on which the person rests with the body is provided with. Furthermore, the support structure as a whole must be able of preventing or at least minimizing other diseases such as allergic forms.

Mattresses, blankets, duvets, mattress covers, cushions, coverings and so on must guarantee a healthy air circulation in order to optimize body transpiration and prevent humidity stagnation, thus ensuring a constant and dry heat.

At the same time, it is important that such comfort elements which can be placed on a generic seating or resting surface, such as a seat of a motor vehicle for instance, can be washed and disinfected to ensure adequate hygiene conditions that protect the human body from mites, bacteria, molds and dust, which often cause allergies and infections for people (driver and passengers of the motor vehicle).

It should be considered the fundamental role that could have a comfort element such as a covering or a cushion in relation to each of the factors listed above when applied over a seat of a vehicle—especially a car, in which it has been calculated each person spends on average two hours a day, or even more a truck, an articulated lorry, a van, a trailer truck, a car transporter or similar where at least the driver spends most of his daily time—.

The invention concerned refers in particular (though not exclusively) to the property of breathability, linked to hygroscopicity (or hygroscopy), and to the property of thermoregulation, linked to the insulation, typical of a covering (a kind of soft support, almost to constitute a cushion), whose role in determining effective sitting conditions for the driver of a vehicle is increasingly necessary and relevant.

Briefly, it should be noted that hygroscopicity means the ability of a substance to readily absorb the molecules of water present in the relative surrounding environment, in this case the sweat of the human body of the person.

By thermoregulation, on the other hand, it is meant the maintaining of the temperature of a body at a constant degree, independently of the temperature variations of the external environment.

The main drawback of the common known seats for vehicles (such as those ones described above by way of example) derives from the conditions of thermoregulation and hygroscopicity that they produce: however high they are, they are not ideal for the physical integrity of people, especially if they are forced to spends many hours inside the vehicle, for example for work needs.

Indeed, the constructive shape and materials with which they are made of do not allow the seats of known type for vehicles, with the padded coverings or cushions which they are provided with, to relevantly and effectively retain the humidity, thus limiting its release or stagnation, with all the disadvantages, inconveniences, discomforts and troubles that follow for the physique of the driver and also of the passenger, especially at the lumbar area of the back and not only, although in a preponderant way, during summer. It should be thought, for example, to the sweating that occurs in summer at the lumbar area of the driver's back, even in a short time in presence of high temperatures, obviously except for the circulation, in the passenger compartment, of air conditioning whose presence, as it is well-known, however, is often source of problems induced for the health of the people on board of the vehicle, even if it is finely regulated, as well as welcome or appreciated in equal measure by all the people.

The air conditioning of which almost all modern cars are equipped, indeed, only improves the air conditions present in the passenger's compartment but does not in any way affect the conditions of breathability, comfort, thermoregulation and hygiene of the support surfaces as they are the seats.

At the same time, coverings of vehicles seat available on the market cannot be effectively washed for example in water, so that the hygiene and cleanliness conditions for the driver and passengers of the vehicle are precarious or not fully adequate and satisfactory.

In addition, vehicles seats of the prior art suffer from the fact that they are unable to achieve the ideal or at least desired thermoregulability (or thermoregulation) conditions of the body of the driver and of the passengers who sit on them, even for a very long time. The fact that these seats, object of the present invention, don't determine ideal conditions for blood and lymphatic circulation for the driver and passengers' body should be added to this aspect.

As a consequence, vehicle seats expose the people' body who rest on them to not properly ideal environmental conditions, capable to cause rheumatism problems that are often bothersome and difficult to solve and, in general, to little or in any case greatly improvable comfort.

The present invention intends to overcome the drawbacks of the prior art just briefly described.

In particular, main purpose of the present invention is to provide a vehicles seats covering that possesses better hygroscopic properties than those ones of similar coverings of the known type.

Within this scope, it is task of the present invention to make the sitting on a vehicle seat more comfortable, for example improving the daily life conditions of a person such as a driver of a bus, a truck, a trailer truck, an articulated lorry or even a simple car, which notoriously spends most of his day driving the vehicle for business needs.

It is another task of the invention to limit the effects of the sweating and, more generally, the physical troubles suffered by the rheumatism of a person while sitting in driving a vehicle, as well as of the passengers of the vehicle.

It is a second purpose of the present invention to devise a vehicles seats covering which can firmly rest on the sitting surface of the seat even without the aid of hooking means such as rubber bands, laces and/or similar, although their provision is preferable, appropriate and recommended.

It is a further purpose of the invention to provide a vehicles seats covering that is thermoregulating, transpiring, hypoallergenic, very soft and light, practical to wash in water, pleasant to touch and use and which is thus able to improve blood circulation in the body of the people who remain seated, even for many hours of the day, on vehicles seats.

It is another purpose of the present invention to create a vehicles seats covering which, by virtue of its easy washing in water, generates cleaning and hygiene conditions inside the vehicle compartment better than those ones currently found.

A last but not least purpose of the invention is to provide a covering of vehicles seats which is practical and easy to use by the end user.

Said purposes are achieved by a vehicles seats covering according to the attached claim 1, as hereinafter referred for the sake of brevity of exposure.

Further construction features of detail of the vehicles seats covering of the invention are given in the corresponding dependent claims.

The aforementioned claims, specifically and concretely defined below, are integral part of the present description.

Advantageously, the innovative covering object of the invention, on which a person rests as a driver of a vehicle, such as a car, a truck, an articulated lorry, a trailer truck, a car transporter, a van and similar, or even as simple passenger, is able to reduce the formation and stagnation of humidity generated by the contact of the person's body with the seat to a greater extent than the known art, while keeping constant also the body temperature.

This is due to the presence of the main inner chamber and the auxiliary inner chamber, each also called "hygroscopic chamber" and defined in the paddings contained in the respective two main portions of the laminar shell of the covering of the invention: each of these paddings—which, therefore, remain totally hidden from view from the outside being contained in the laminar shell—preferably includes two common padded items of linen (or cushions), coupled together through junction means in such a way as to define the main inner chamber and auxiliary inner chamber themselves.

Advantageously, therefore, the innovative covering of the invention is configured as a thermo-regulating and transpiring element which makes sitting on vehicles seats more comfortable, healthy and favorable for the purpose of blood and lymphatic circulation of the body of the person.

Equally advantageously, the covering of vehicles seats of the present invention is an article of high quality and durability also due to the fact that the paddings are preferably made of down and, in particular, of Siberian and/or Tibetan down.

Specifically, the first and second cushions which preferably make up the various paddings of the laminar shell of the covering of the invention are padded with the full-bodied and soft down flakes taken from the undercollar and chest of the goose, particularly elastic and resistant, especially if the geese are bred to their full maturity or live in the wild in a harsh climate.

The down of which the cushions belonging to the covering of the invention are (preferably, it is repeated) padded is, by way of preference, that one that falls spontaneously and naturally from the body of the Tibetan or Siberian goose, as known protected species, and is, therefore, available in limited quantities.

The natural properties of the goose down, therefore, such as hygroscopicity, insulation, elasticity and volume, allow to create an antiallergic and anti-rheumatic support which, in the current invention, helps to promote healthy body transpiration, a better blood circulation and a comfortable seat for the user (driver or passenger of a vehicle).

The specific structural shape, the absolute naturalness and the careful selection of the materials used for its components allow to provide the covering of vehicles seats of the invention described herein with a long-life warranty offered to the end user.

In advantageous manner, moreover, the covering of vehicles seats of the invention, widely limiting with respect to the prior art the effects of sweating—especially at the lumbar area of the back during summer—suffered by people in the passenger compartment of a vehicle, allows to reduce the negative consequences which derive from such a sweating, such as a management of the air conditioning in the vehicle not always optimal and uniform for all the passengers and the onset of tiresome flu states and articular pains during the hottest season, due to sudden changes of temperature caused by the switching on of the conditioned air, with the remarkable advantages that this entails for the health of the people such as the lack of necessity to resort to medicines or treatments in specialized medical structures.

Said purposes and advantages, as well as other ones that will emerge in the continuation of the text, will be more evident from the following description, relating to a preferred embodiment of the vehicles seats covering of the invention given by indicative and illustrative, but not limitative, way with reference to the attached tables of drawings where:

FIG. 1 is an assonometric view of the vehicles seats covering of the invention, in non-operative/applicative conditions;

FIG. 2 is another truncated assonometric view of the covering of FIG. 1;

FIG. 4 is a further assonometric view of the covering of FIG. 1;

FIG. 5 is a partial and simplified assonometric view, from the rear part, of the covering of FIG. 1;

FIG. 6 is a partial and simplified assonometric view, from the rear part, of the covering of FIG. 1, in which the closing means are in the non-operative position and open the second functional housing of the second portion of the laminar shell of the covering of the invention;

Figure 3:
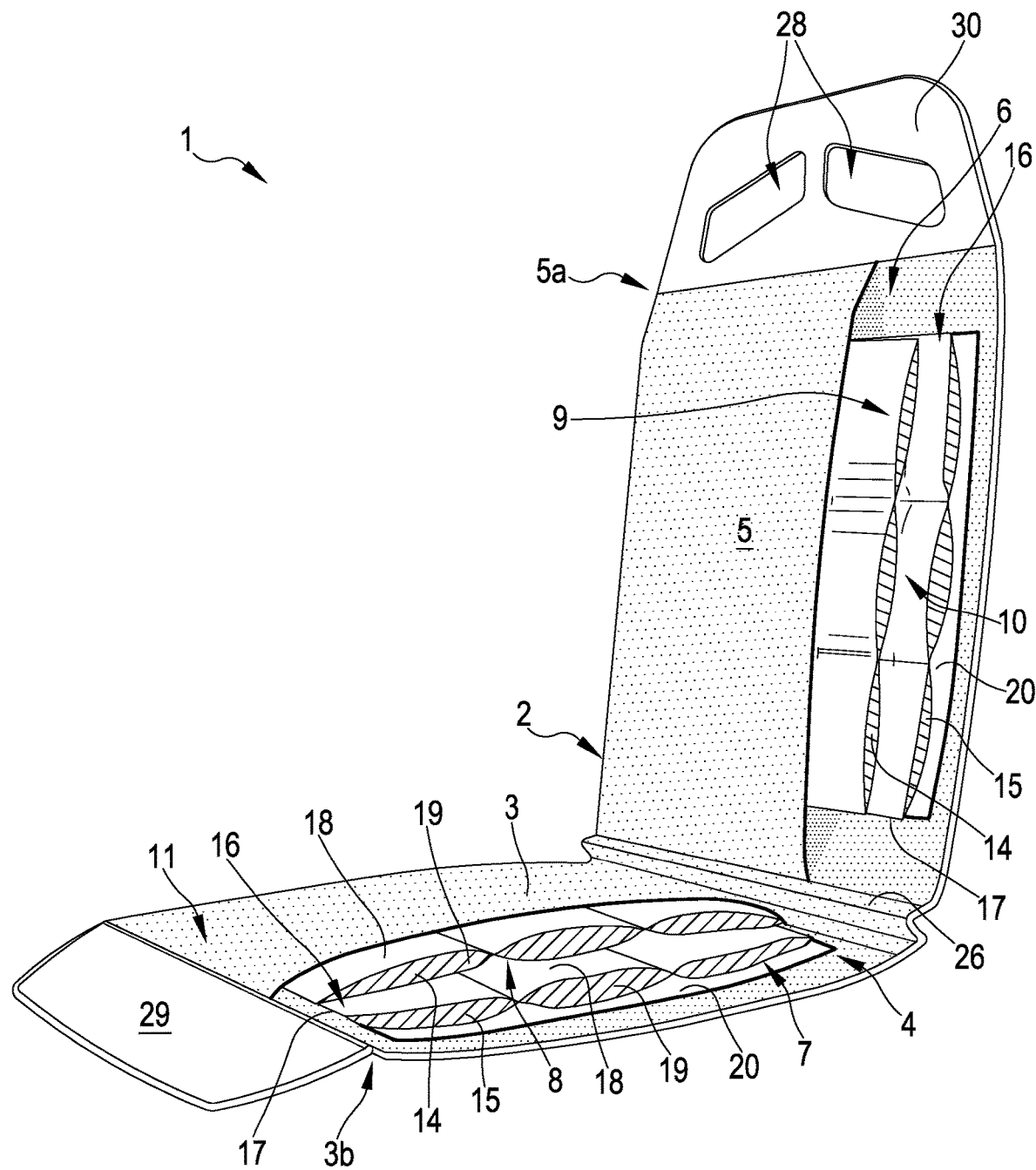
FIG. 3 is a simplified and sectioned assonometric view of FIG. 1.
Figure 7:
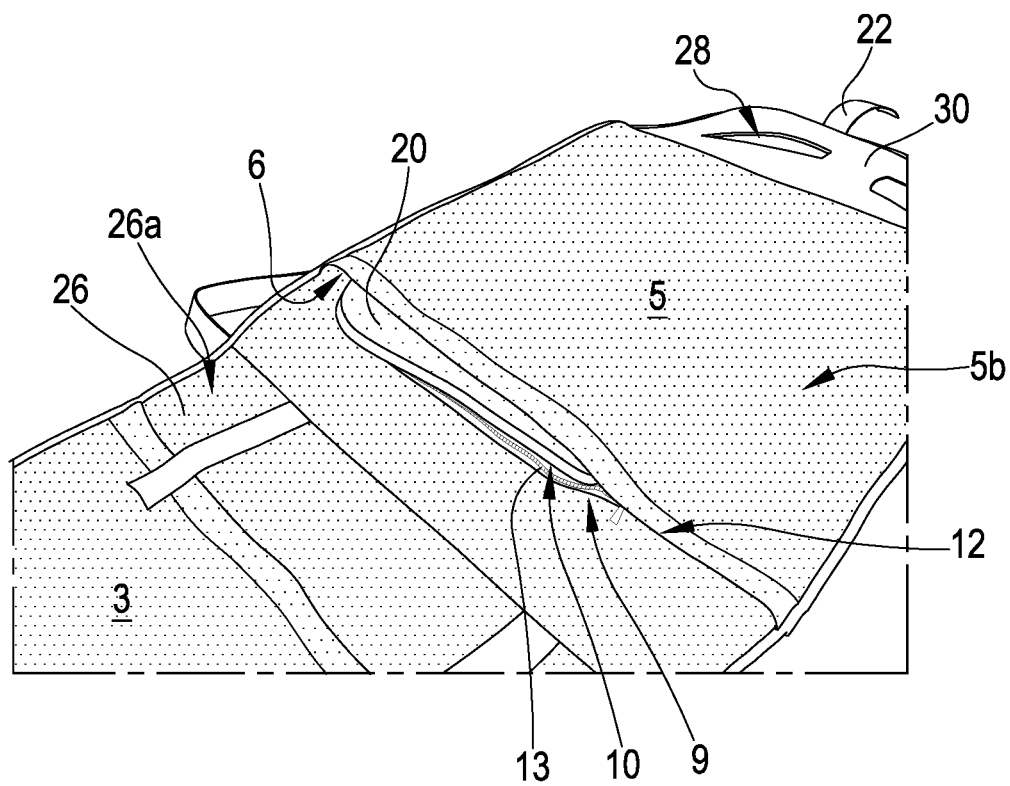
FIGS. 7 and 8 are two partial and enlarged assonometric views, from the rear part, of the covering of FIG. 1 which show the sequence of operations to be performed in order to introduce the second padding into the second functional housing of the second portion of the laminar shell of the covering of the invention.

The vehicles seats (not shown for the sake of exposition simplicity and constituted for example by cars) covering of the present invention is illustrated in FIGS. 1 and 2, where it is globally numbered with 1.

According to the invention, the covering 1 comprises a laminar shell 2 suitable for being applied to a vehicle seat and which includes:
- a first portion 3, adapted to be arranged to cover the upper surface of the sitting suitable to support the pelvis (or buttocks) of the passenger and belonging to the vehicle seat, the first portion 3 being shaped in such a way as to present a first functional housing 4;
- a second portion 5, adapted to be arranged to cover the front surface of the backrest suitable to support the back and/or lumbar area of the passenger and belonging to the vehicle seat, the second portion 5 being shaped in such a way as to present a second functional housing 6;
- a first padding 7 inserted into the first functional housing 4 of the first portion 3 and having a main inner chamber 8 adapted to improve the comfort, thermoregulation, breathability and hygroscopicity properties of such a laminar shell 2;
- a second padding 9 inserted into the second functional housing 6 of the second portion 5 and having an auxiliary inner chamber 10 adapted to improve the comfort, thermoregulation, breathability and hygroscopicity properties of the laminar shell 2.

Preferably, the laminar shell 2 is suitable to be removably applied to the seats (generally the front ones) of the vehicle in such a way as to ease its maintenance, cleaning or complete washing in water easier, replacement or simply non-use if not desired for any reason by the driver and/or passenger of the vehicle.

In a preferred but non-binding way, the laminar shell 2 comprises a three-dimensional open-weave mesh 11, having a honeycomb look, made of a synthetic technical fabric and adapted to accentuate the breathability property of the laminar shell 2 of the covering 1 of the invention; in particular, such a synthetic technical fabric is a polyester, better known under the trademark name of "Airnet", which exhibits excellent resistance to abrasion and is commercially available in various weights (for example 230 gr/m$^2$) and colors.

It is widely known that heat and dryness alleviate pain, as it is known that cold and humidity, on the contrary, aggravate them and promote diseases.

It is therefore natural that, to combat rheumatism, doctors invite people to keep themselves as warm as possible and with their bodies dry, not exposed to humidity, as the heat and the dry favour dilatation of the blood vessels and normalization of blood circulation, muscles relaxation, any contractions disappearance, comfortable rest or sitting on a support structure.

This is particularly recommended not only (though mostly) for disabled people forced to spend most of their time on a wheelchair or at bed, but also for those ones who spend most of their working day on a vehicle, such as drivers of articulated trucks, trailer trucks, buses, city buses, trains, trucks, car transporters, vans, little vans and product representatives for companies.

The benefit that derives from observing these behaviors is evident, also, for those ones who suffer from rheumatic diseases in general, stiff neck, back pains, tears, sciatica and so on.

Through its own constructive shape, marked (as better shown in FIG. 3) by the presence of the main inner chamber 8 in the first padding 7 contained in the first functional housing 4 of the first portion 3 of the laminar shell 2 and of the auxiliary inner chamber 10 in the second padding 9 contained in the second functional housing 6 of the second portion 5 of the laminar shell 2 itself, the covering 1 of the invention achieves to a greater extent, compared to the prior art, the aforesaid hot and dry conditions for the body of a person while driving the vehicle or only remaining sitting inside it.

In particular, moreover, both the first padding 7 and the second padding 9 are in this case removably inserted into respectively the first functional housing 4 and into the second functional housing 6 in such a way as to be, if necessary, easily and temporarily extractable therefrom in order to carry out their cleaning, washing, repair and/or replacement.

It is understood that in other embodiments of the covering of the invention, not shown, only one of the first padding and the second padding can be removably coupled with the respective functional housing of the two portions of the laminar shell.

At preferred but not binding title, the covering 1 of the invention also includes closure means, generally indicated 12, available to the driver/passenger of the vehicle, operatively connected with the first portion 3 and with the second portion 5 and adapted to be operated or handled, for example by the end user, to selectively close and open the first functional housing 4 and the second functional housing 6 and thus allow introduction, removal, inspection and eventually replacement of the first padding 7 and second padding 9 and obviously the inspection of the first functional housing 4 and second functional housing 6.

The closure means 12, visible in FIGS. 4-9, comprise any of the mechanical locking systems easily and effectively separable and restorable selected from the group consisting of a zipper 13 (shown in the attached figures), hook/eyelet textile closure (the latter also known with the trademark of Velcro®), buttons/eyelets, laces and the like.

It is also clear in this case that in further embodiments of the covering of the invention, not shown in the attached drawings, the closure means may be operatively connected only with one of the first portion and second portion and operated to selectively close and open the first functional housing and/or second functional housing and thus allow introduction, removal, inspection and/or possibly replacement of the first padding and/or second padding as well as inspection of the first housing functional and/or second functional housing.

According to the preferred embodiment described herein of the invention, each of the first 7 and second paddings 9 comprises a first padded cushion 14 and a second padded cushion 15, stably and firmly connected each other through junction means, overall indicated with 16, suitable to define the main inner chamber 8 and auxiliary inner chamber 10, as it can be got by looking again at FIG. 3.

Preferably but not necessarily, the junction means 16 include a continuous perimetrical seam stretch 17, while being understood that in other embodiments of the invention, not shown in the attached figures, the junction means concerned could be of another suitable type or they could comprise a continuous multiple stretch of perimetrical seam.

FIG. 3 also shows that, in a preferred but not limiting manner, each of the cushions 14 and 15 of each padding 7 and 9 comprises a fabric sheath 18 filled with filamentary elements 19 (and/or with flakes) adapted to provide to these elements of the covering 1 of the invention at least suitable softness, elasticity, hyponallergic, hygroscopicity, thermo-regulation and thermal insulation properties.

In particular way, the fabric sheath 18 is preferably made of a material comprising cotton; even more preferably, such a material of the fabric sheath 18 comprises silver yarns immersed and mixed in the cotton.

It is highlighted how, advantageously, the outer fabric sheath 18 of tightly woven blocks the penetration and proliferation of dust mites, preventing or at least limiting allergies.

In turn, the filamentary elements 19 contained in the outer fabric sheath 18 comprise any of the elements selected from the group consisting of downs, wool, bristles, horsehair, feathers, synthetic fibres and/or similar.

Conveniently but not exclusively, if the filamentary elements 19 comprise downs, they are preferably of the Siberian and/or Tibetan type: these particular downs are capable of absorbing the humidity and avoiding stagnation in order to allow the fabric sheath 18 surrounding them—and with which the body of a person comes only indirectly into contact when the person sits on the seat of the vehicle—to remain suitably dry.

Downs contained in the outer fabric sheath 18 made of at least cotton are in a predetermined and adequately calibrated quantity, correlated with the support and breathability function performed by the first cushion 14 and second cushion 15 which, preferably, belongs to the paddings 7 and 9 of the laminar shell 2 of the covering 1 of the invention.

Each of the downs consists of an extremely light three-dimensional flake, comprising a central core from which a plurality of beards branches out in such a way as to create a plurality of air chambers.

The Siberian and/or Tibetan down is thermoregulating, since it offers a good thermal insulation that allows to keep the temperature of the body of the person constant and to spread the heat in a homogeneous way.

The set of down flakes or filaments gives the first cushion 14 and second cushion 15 of the two paddings 7 and 9 of the covering 1 of the invention elasticity, volume and lightness, unlike a feather of traditional type that is rigid, flat, heavy and with little ability to absorb air.

The paddings 7 and 9, once removed from the functional housings 4 and 6, can be washed simply in water and neutral soap and then rinsed and dried in air and in shade.

It is also possible to wash the paddings 7 and 9 even in dry cleaner's with water at 40÷60° C., neutral soap and thorough rinsing, ensuring over time high hygienic conditions that preserve from mites, bacteria, molds and powders which often cause allergic and infectious diseases. The drying of the paddings 7 and 9 could occur with dryer at a temperature of about 40÷60° C.

The padding of the outer fabric sheath 18 of each cushion 14 and 15 with a percentage of 100% of down, as mentioned, greatly increases the hygroscopicity obtained in primary way with the inner main chamber 8 and with the auxiliary inner chamber 10, since the downs absorb the body humidity during the sitting on the covering 1 of the invention, leaving it to evaporate during the non-use of the covering 1 itself.

The importance of the thermo-regulating function of the downs is furthermore emphasized, deriving from the considerable quantity of air retained by the three-dimensional flakes able to homogeneously diffuse the heat.

All this, together with the natural insulation of the down due to the ability of the flakes to absorb and retain considerable quantities of air, generates considerable advantages for people with allergy and/or rheumatism problems, as well as favoring their sitting in a vehicle, especially for the driver, in absolutely comfortable conditions.

Indeed, the down, especially if Tibetan, when washed, sterilized and de-dusted is hypoallergenic and, therefore, suitable for people allergic to dust.

It should be added that more than any other covering material, the cotton of the outer fabric sheath 18 also prevents the downs from causing allergic reactions: what just said emphasizes the beneficial synergistic effect of the downs with the material of the fabric sheath 18.

Finally, the down, in particular if subjected to the treatments mentioned above, does not represent the ideal habitat for dust mites since it is not a source of nourishment thereof.

The downs of the type utilized, preferentially, in the cushions 14 and 15 of the covering 1 of the invention do not release vapors or substances harmful to the man and the environment: indeed, not only the raw materials utilized are natural, but also their manufacturing process takes place according to methodologies which comply with environmental needs.

Preferably but not necessarily, the first padding 7 and second padding 9 are partially coated with a laminar mesh 20 made of a technical fabric of synthetic material, firmly coupled with the paddings 7 and 9 through the aforesaid junction means 16 and adapted to reinforce and support each of these paddings 7 and 9.

The synthetic material of such a laminar mesh 20 is, preferably, a thickened three-dimensional polyester having a cell structure which, on one hand, contributes to the breathability of the paddings 7 and 9 and, on the other hand, gives support to each of the paddings 7 and 9 themselves. Even more preferably, for example, the polyester has a thickness of substantially 7 mm and a weight of 630 g/m$^2$.

As it can be seen in the figures mentioned up to now and with greater detail in FIGS. 4-10, the laminar shell 2 includes hooking means, overall numbered with 21 and adapted to ensure the stability of the coupling of the laminar shell 2 with the vehicle seat, especially when the driver and/or passenger is getting on/off in/from the latter.

Figure 8:
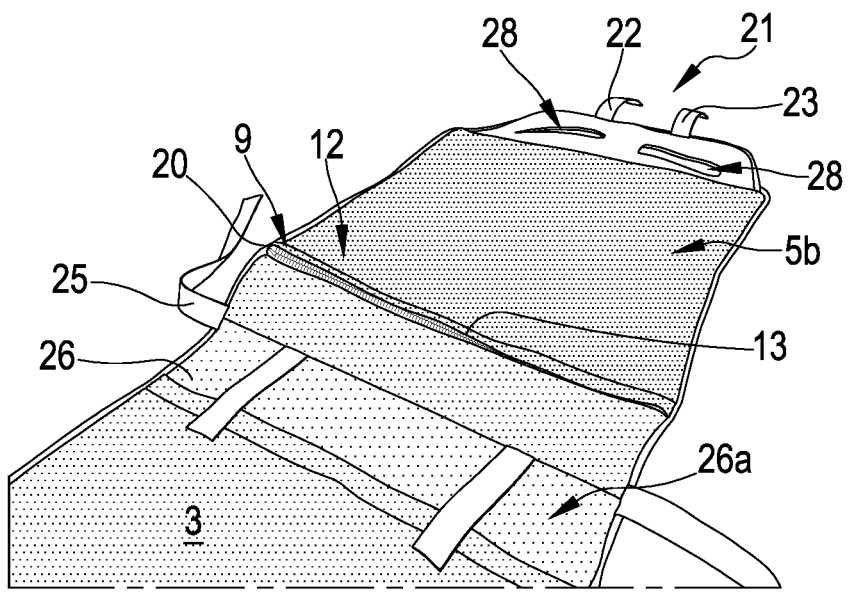
Figure 9:
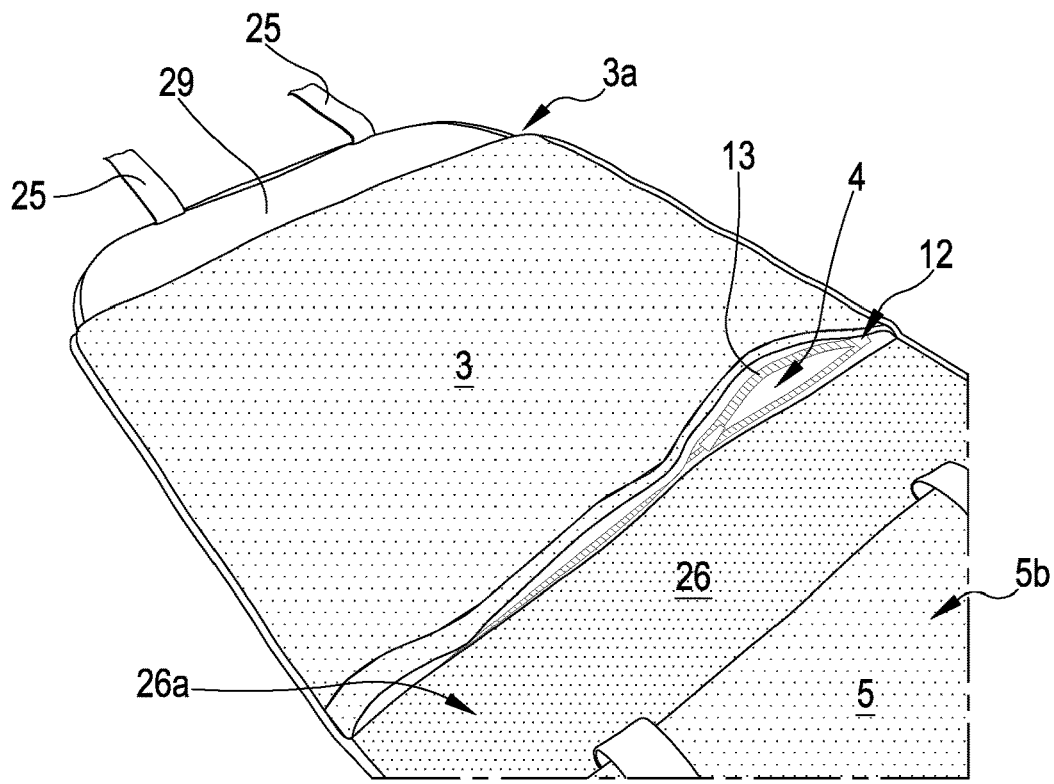
FIG. 9 is a partial and simplified assonometric view, from the rear part, of the covering of FIG. 1, in which the closing means are in the non-operative position and open the first functional housing of the first portion of the laminar shell of the covering of the invention.
Figure 10:
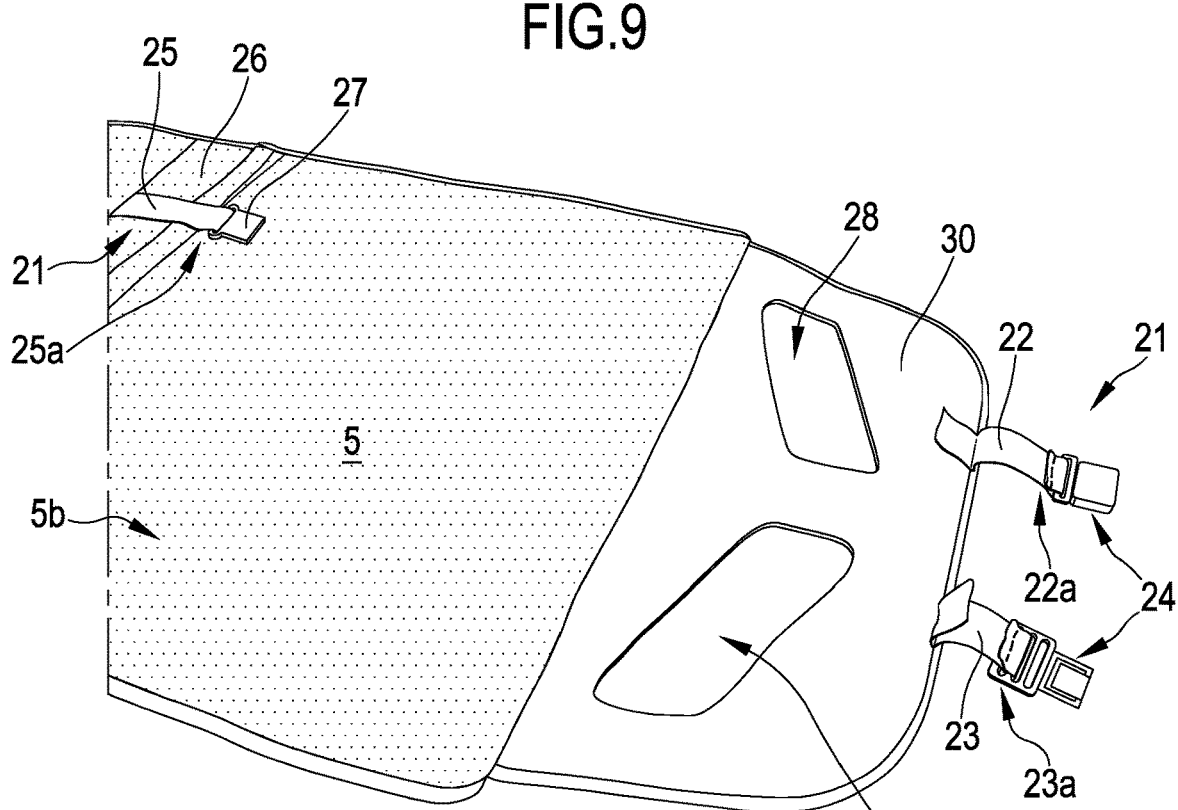
FIG. 10 is an enlarged assonometric view, from the rear part, of a detail of the covering of FIG. 1.

In a preferred but non-binding manner, as better highlighted by FIGS. 8-10, the hooking means 21 comprise in the specific case:

a pair of laminar tapes 22, 23 applied to the upper part 5a of the second portion 5 of the laminar shell 2 in such a way as to protrude from the rear surface 5b of the second portion 5 and adapted to be connected each other through a quick coupling, generally numbered with 24, placed at the ends 22a, 23a of the laminar tapes 22, 23, so as to wrap the headrest of the seat of the vehicle when the covering 1 is applied thereto (removably in this case, as already mentioned), and/or a plurality of laminar tangs 25 protruding from the rear surface 26*a* of an intermediate laminar portion 26 which in this case belongs to the laminar shell 2 and joins, keeping them separated, the first portion 3 to the second portion 5 of the laminar shell 2 itself, each of said laminar tangs 25 being provided at the ends 25*a* of a coupling 27 adapted to be hooked to the lower part of the sitting of the vehicle seat.

In the preferred embodiment of the covering 1 of the present invention under description, therefore, the intermediate laminar portion 26 is monolithic with the first portion 3 and second portion 5 in such a way that the laminar shell 2 is properly a single piece, with consequent advantages in relation to its production cost.

However, this does not exclude that, in alternative (though not preferable) embodiments of the covering of the invention, herein not accompanied by reference drawings, the intermediate laminar portion is an element distinct from the first portion and the second portion of the laminar shell, coupled with it by appropriate connecting means.

In addition, further optional embodiments of the covering of the invention, not shown in the following, could provide that the hooking means comprise a number of laminar tapes different from that one illustrated in the attached figures, this number being able to vary at will according to requirements and construction choices.

It is also evident that in other embodiments of the invention, not shown, the covering could include hooking means of type and composition different from those ones just described and visible in the attached figures, for example they could comprise only laminar belts which join together in the lower part of the sitting of the seat and/or in the rear part of the backrest of the seat of the vehicle, projecting laterally from the first portion and/or second portion of the laminar shell, as well as from the rear surface of the intermediate laminar portion.

Both in case of the laminar tabs 25 provided each with attachment 27 and in case of laminar belts, some of them, in order to be positioned in the operating position, are properly placed passing through the transverse slot which traditionally, in a vehicle seat, separates the sitting by the backrest.

Finally, some accessory features of the covering 1 of the invention should be observed, such as the typical sporty profile conferred by the through openings 28 made in the head 30 of the upper part 5*a* of the second portion 5 of the laminar shell 2, and the laminar front panel 29 protruding from the front edge 3*a* of the first portion 3 of the laminar shell 2 and made of synthetic technical fabric: this laminar front panel 29 has the function of also covering the front part of the sitting of the vehicle seat, thus avoiding that the driver and the passenger directly contact, with their legs or long pants they wear, the seat itself.

From an operative point of view, the user—usually the vehicle owner—places the covering 1 of the invention in the operating (or use) position by laying the laminar shell 2 on the vehicle seat, in particular the first portion 3 on the upper surface of the sitting and the second portion 5 close to the front surface of the backrest of the seat itself.

In order to ensure firmly, although in this case removably and temporarily, in this position the laminar shell 2 of the covering 1 of the present invention, the user first mutually couples the laminar tapes 22, 23 around the headrest of the vehicle seat, through the quick coupling 24 of the hooking means 21 arranged in the upper part 5*a* of the second portion 5, as well as subsequently the laminar tangs 25 through the respective attachment 27 with the lower part of the sitting of the vehicle seat.

The user performs in reverse these operations, in a simple and rapid manner, whenever it is desired, for any reason or need, to remove the covering 1 of the invention from the vehicle seat.

On the basis of the foregoing, it is understood, therefore, that the vehicles, in particular cars, seats covering of the invention achieves the purposes and reaches the advantages previously mentioned.

Upon execution, changes could be made to the innovative covering of vehicle seats of the invention, consisting, for example, in a number of padding contained in the housing of at least one of the two portions of the laminar shell different from that one visible in the drawing tables attached and described above, such a number being able to vary at will, starting from one.

There could also be alternative embodiments of the vehicles seats covering of the invention, not specifically represented in the attached drawings, in which, contrary to what has been previously described, at least one of the padding associated with the laminar shell could have more than one unique hygroscopic inner (main and auxiliary) chamber.

Furthermore, the material which the cushions are made of which, preferably, form the padding could be any, different from that one previously described, and this according to the constructive choices made, which does not affect the main advantage brought about by the present invention.

In addition to this, in other embodiments of the invention, not yet illustrated in the accompanying figures, the junction means which stably and definitively connect each other the first cushion and second cushion of the padding inserted into the respective housing of at least one of the two portions of the laminar shell could be arranged at inners areas of the cushions themselves, thus identifying inner chambers smaller in size than that one defined by junction means arranged perimetrically.

Further optional embodiments of the vehicles seats covering of the invention, not shown, could provide that the laminar shell comprises more than one functional housing for at least one of the two primary portions which form it.

It is, finally, clear that several other changes could be made to the vehicle seats covering concerned, without departing from the principle of novelty intrinsic in the inventive idea expressed herein, as it is clear that, in the practical implementation of the invention, materials, shapes and sizes of the illustrated details could be changed, as needed, and replaced with others technically equivalent.

Where the constructive features and techniques mentioned in the following claims are followed by reference numbers or signs, those reference signs have been introduced with the sole objective of increasing the intelligibility of the claims themselves and therefore they have no limiting effect on the interpretation of each element identified, by way of example only, by these reference signs.

The invention claimed is:

1. A vehicle seat covering for covering a user seat of a vehicle having a lower sitting portion and a back portion, the vehicle seat covering comprising:
   a laminar shell including a first portion configured to be arranged to cover an upper surface of the lower sitting portion, which supports a lower pelvis area of a user, said first portion having at least one first functional housing;
   a second portion configured to be arranged to cover a front surface of the backrest, which supports a back and/or lumbar area of said user, said second portion having at least one second functional housing;

at least one first padding inserted into said first functional housing of said first portion and having at least one main inner air chamber suitable to improve the comfort, thermoregulation, breathability and hygroscopicity properties of said laminar shell;

at least one second padding inserted into said second functional housing of said second portion and having at least one auxiliary inner air chamber suitable to improve comfort, thermoregulation, breathability and hygroscopicity properties of said laminar shell, and wherein said laminar shell comprises a three-dimensional open-wave mesh, configured as a honeycomb, and made of a synthetic technical fabric so as to accentuate a breathability property of said laminar shell.

2. The seat covering according to claim 1, wherein said laminar shell is configured to be removably applied to said seat of said vehicle.

3. The seat covering according to claim 1, wherein at least one of said first padding and said second padding is removably inserted respectively into said first functional housing and into said second functional housing.

4. The seat covering according to claim 1 further including a closure means configured to be accessible to said user, said closure means being operatively connected with at least one of said first portion and said second portion and configured to be manually operated by the user to selectively close and open the at least one of said first functional housing and said second functional housing so as to selectively allow introduction, removal, inspection and replacement of said first and second paddings and inspection of said first and second functional housings.

5. The seat covering according to claim 4, wherein said closure means comprises a mechanical locking system.

6. The seat covering according to in claim 5, wherein said mechanical locking systems comprises at least one of a zipper, hook/eyelet textile closure, buttons/eyelets, and laces.

7. The seat covering according to claim 1, wherein each of said first and second paddings comprises a first padded cushion and a second padded cushion, stably and firmly connected to each other through junction means suitable to respectively define said main inner air chamber and said auxiliary inner air chamber.

8. The seat covering according to claim 7, wherein said junction means includes at least a parametrical seam stretch.

9. The seat covering according to claim 7, wherein each of said cushions comprises a fabric sheath filled with filamentary elements suitable to provide at least softness, elasticity, hypoallergenic, hygroscopic, thermoregulation and thermal insulation properties.

10. The seat covering according to claim 9, wherein said fabric sheath is made of a material comprising cotton.

11. The seat covering according to claim 9, wherein said filamentary elements comprise a material including one or more downs, wool, bristles, horsehair, feathers, and synthetic fibers.

12. The seat covering according to claim 11, wherein said downs include at least one of Siberian and Tibetan type downs suitable to absorb moisture to allow said fabric sheath that surround them, and with which the body of said user comes into contact, to remain dry.

13. The seat covering according to claim 7, wherein said first padding and said second padding are at least partly coated with a laminar mesh made of three-dimensional fabric made of synthetic material, firmly coupled with said paddings through said junction means and suitable to reinforce and support said first padding and said second padding.

14. The seat covering according to claim 1, wherein said laminar shell includes a fastener suitable to ensure the stability of the coupling of said laminar shell with said seat of said vehicle.

15. The seat covering according to in claim 14, wherein said fastener comprises:

a pair of laminar tapes applied to an upper part of said second portion of said laminar shell so as to protrude from a rear surface of said second portion and suitable to be connected to each other through a quick coupling, placed at the ends of said laminar tapes, so as to wrap about a headrest of said seat of said vehicle, and/or at least one laminar tang protruding from a rear surface of an intermediate laminar portion which joins, keeping them separated, said first portion to said second portion of said laminar shell, said at least one laminar tang being provided at the end of a coupling suitable to be hooked to a lower part of said lower sitting portions of said seat of said vehicle.

* * * * *